E. DE LORENZI.
APPARATUS FOR MEASURING LOADS.
APPLICATION FILED JAN. 15, 1908.
954,262.
Patented Apr. 5, 1910.
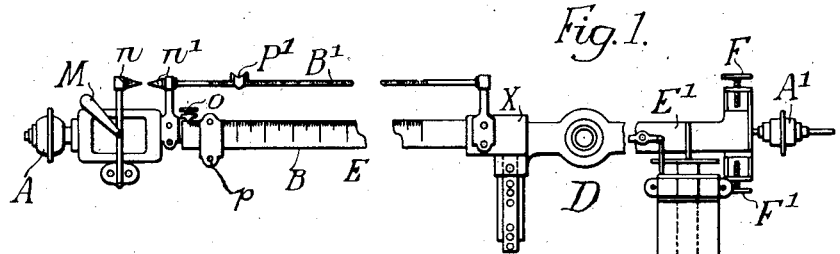
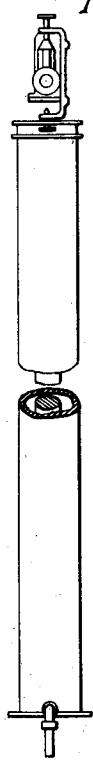
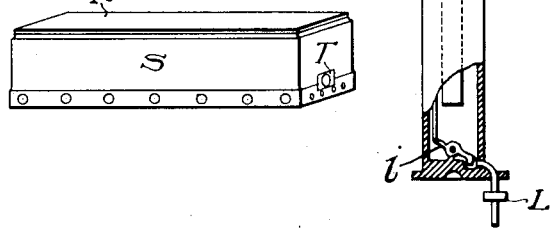
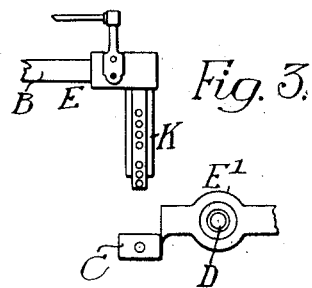
Witnesses—
Walter Chism
Willa A. Burrowes
Inventor—
Emilio De Lorenzi.
by his Attorneys—
Howson & Howson

UNITED STATES PATENT OFFICE.

EMILIO DE LORENZI, OF GENOA, ITALY.

APPARATUS FOR MEASURING LOADS.

954,262.  Specification of Letters Patent.  Patented Apr. 5, 1910.

Application filed January 15, 1908. Serial No. 410,899.

*To all whom it may concern:*

Be it known that I, EMILIO DE LORENZI, subject of the King of Italy, residing at 10 Campetto, Genoa, Kingdom of Italy, have invented certain new and useful Improvements in Apparatus for Measuring Loads, of which the following is a specification.

The object of the present invention is to provide an apparatus, whereby it shall be possible to determine at any moment the weight of the cargo of a ship, although the device may be also utilized to give the weight of a load on terra firma. The operation of the device is based upon the well known principle that a body immersed in a liquid is buoyed or pushed up by a force equal to the weight of the volume of liquid displaced. When this push is equal to the weight of the body immersed, the latter remains in equilibrium in the liquid.

The above object I secure as hereinafter set forth, reference being had to the accompanying drawings, in which:

Figure 1, is a front view of the apparatus constituting the main part of my invention; Fig. 2, is a side elevation of the same: Fig. 3, is an elevation of the adjacent ends of the two parts of the scale beam, showing them as separated; and Fig. 4, is a perspective view of the load receiving box employed when my device is used to determine the weight of a load on terra firma.

In the above drawings H is a cylindrical or other suitably shaped body whose upper extremity is fixed tightly to a lever E, E', mounted to oscillate around the fulcrum D, which is carried by a suitable supporting structure omitted from the drawings. The lever is provided with a graduated portion B, on which there is slidably mounted a weight P provided with an indicator O.

The body H is placed inside a vertical tube G, which has connected to its lower end a conduit L in which is a valve *l* operated through a rod *l'* extending through said tube and projecting out of the upper end thereof.

The whole apparatus is placed within the ship, the weight of whose cargo it is desired to measure, and the tube G is put into communication with the outside water by means of the above mentioned conduit pipe, the cock L being open so that the water will rise in said tube G to the same level as outside the ship. The body H will thus be more or less immersed in the water contained in the tube G and will therefore be pushed upward so as to disturb the equilibrium of the lever. In order to reëstablish this equilibrium it is necessary to move the weight P along the graduated portion B of the scale from the zero position which it occupies when the vessel is unloaded and in which said lever is balanced. In order to obtain this original balance a counter-weight A is employed which may be adjusted at the extremity of the rod of the lever. When the latter is in equilibrium the indicators *n*, *n'*, of which one moves with the lever and the other is fixed to the support of the apparatus, must stand at one and the same height.

When the ship is being loaded, the depth of its immersion will increase and the level of the water in the tube G will also rise, so that it will be necessary to displace the weight P along the graduated portion B of the scale beam in order to maintain the lever in equilibrium. In other words, each position of the weight P upon the graduated portion B of the scale beam will correspond, when the lever is in the position of equilibrium, to a certain depth of immersion of the ship. In order to render the measurement more precise, a second graduated beam B' with a weight P' is fixed to the lever, by means of which it is possible to measure fractions of the units of the graduations on the beam B.

By reading the indications shown by the indicators of the weights P and P' upon the respective graduated beams B and B', the exact weight of the cargo loaded is obtained.

The graduation of the beams B and B' is made by means of an appropriate scale of proportion compiled on the basis of the different values of the area of the horizontal section of the ship according to the floating line.

In order to correct the error otherwise caused by the differences in the density of water at different localities, an adjustable weight A' is applied to one extremity of the lever, by means of which the above mentioned errors may be corrected.

The apparatus is provided with two finely threaded screws F and F' fixed to the support of said apparatus so as to limit the oscillations of the lever E and E', and there is also a handle M for the purpose of locking the apparatus when it is not in use.

The lever is constituted by two parts E and E' of which the first has at one end a short bar K perpendicular to its general line. The other part is provided at the end opposite to that having the weight A with a socket C designed to receive the bar of the other part E; there being holes both in the bar and in the socket for the reception of a pin (not shown) whereby said parts may be held together in any of a number of adjusted positions.

In case the apparatus is installed in such a position that the reading of the graduated portions B and B' is difficult, it is possible, after having secured the weights P and P' to their respective graduated portions, to separate the first part of the lever from the second part, and remove it to a place where the reading may conveniently be made.

The apparatus may serve also for weighing loads on terra firma and for this purpose I employ the box S, Fig. 3, which is made of metallic plate or other suitable material. Its top R is connected with the rest of the box by means of flexible material such as leather or rubber, so disposed as to secure an hermetical closure of the box while permitting the weight of the top and the load thereon being transmitted to the sides of the box where the latter is filled with liquid. When in use said box is connected at the opening T through the conduit and cock L with the tube G and is filled with water or other suitable liquid.

When a load is placed on the top R of the box S, the liquid contained in the latter will be subjected to a pressure that will produce in the tube G an elevation of the liquid level therein proportional to such load, and from this rise of level the weight of the load may be deduced in the same manner as above described, provided that the scale beams be properly calibrated.

I claim:

1. An apparatus for weighing cargoes on board of ships consisting of a lever having a graduated portion and a supporting fulcrum, an elongated body fixed to one arm of the lever, a tube serving as a container for said body and communicating with the water outside of the ship, so that said body is more or less immersed in the water according to the immersion of the ship, with a weight on the graduated portion of the lever.

2. Weighing apparatus consisting of a scale beam having a fulcrum and provided with a graduated portion, a counterweight, with means for exerting upon said scale beam a force proportional to the weight of the body to be weighed, one portion of said scale beam having a vertical socket, the other having a vertical arm removably fitting said socket.

In witness whereof I have hereunto set my hand in the presence of two witnesses.

EMILIO DE LORENZI.

Witnesses:
GIOVANNI MAQUISO, JEUNE,
AGUSTINE RAFFO.